INVENTORS
JESS W. THOMAS
R. LOUIS BRADSHAW
BY
ATTORNEY

United States Patent Office 2,979,620
Patented Apr. 11, 1961

2,979,620

AIR RADIOACTIVITY MONITOR

R. Louis Bradshaw, Knoxville, Tenn., and Jess W. Thomas, St. Joseph, Mich., assignors to the United States of America as represented by the Secretary of the Army Filed June 20, 1958, Ser. No. 743,463

2 Claims. (Cl. 250—83.6)

This invention relates to a radioactivity monitor and more particularly to a continuous, self-cleansing device for measuring the radioactivity in a gaseous medium.

Various means and methods have been devised in the art for measuring radioactivity among which are the following. The universally used method of collecting samples on plates, filter paper or wires and measuring the radioactivity of the sample. It is obvious that there are great errors possible in such a measurement due to the time delay between collection and measurement. Should there occur a rapid increase in the radioactivity of the contaminated medium, it could attain hazardous proportions before being detected. Also, these devices have been subjected to inaccuracies due to a build up of radioactivity in the device itself, causing an ever increasing background radiation that must be considered in interpreting the data.

In recent years, devices have been developed which are more accurate and permit a substantially instantaneous determination. These devices generally utilize some form of charged electrodes and by a measurement of the variation in the current produced in the electrodes indicate or record the radioactivity present. These apparatuses have met with limited success, since they still do not provide a solution to the ultimate problem of continuously determining the radioactivity in a gaseous medium. In the known prior art, some provision had to be made to clean the electrodes of the adhering particles either by a complete or a partial shutdown of the device. Obviously, such a procedure though necessary nevertheless decreases the efficiency of the apparatus by not permitting complete and continuous availability for radioactivity measurement.

Consequently, it is the primary object of this invention to provide a means and method for continuously accurately measuring radioactivity.

It is a further object of the invention to provide a device which is simple in operation and construction, yet requires substantially no maintenance.

A further and more particular object is to provide a means and method for the self-cleansing of the device.

Another object is to substantially reduce the background radiation in a radiation monitor.

A further object is to provide method and means for cleansing charged electrodes of contamination.

Briefly, this invention comprises the novel means and method for assuring that the charged electrodes of a radioactivity monitor remain free of contamination by the provision of an auxiliary stream of clean gas continuously directed to be in contact with the electrodes such that any foreign particles or efficiency arresting contamination is prevented from reaching or is removed from the electrodes without any interruption in the operation of the electrodes.

These and other objects will be clearly fulfilled and a clear understanding will be had by reference to the following drawing.

Figures 1, 2, 3:
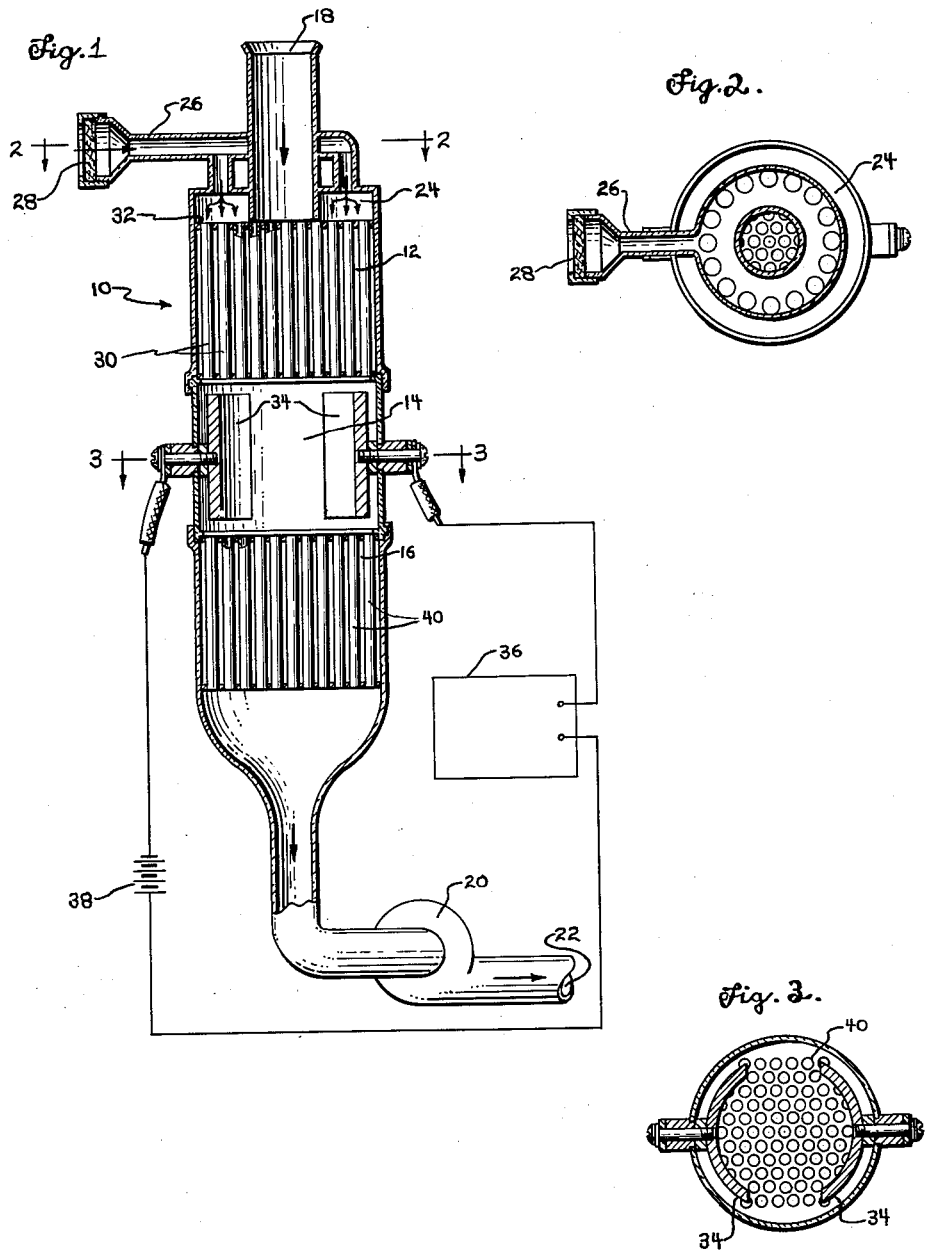
Fig. 1 is a side view of the complete device.
Fig. 2 is a plan sectional view taken along line 2—2 of Fig. 1.
Fig. 3 is a plan sectional view taken along line 3—3 of Fig. 1.

Referring to Fig. 1, 10 generally indicates a housing for a radioactivity monitor comprising a plurality of chambers indicated in the preferred embodiment, though not limited to, an upper gas streamlining chamber 12, an electrode chamber 14 and a lower gas streamlining chamber 16. Contaminated gas, e.g. smoke, is drawn in through inlet 18 which is positioned concentrically with the housing 10 and injects its gas axially into the monitor housing. Motivation for this flow may be by conventional means such as the blower 20, with outlet 22, suitably connected at its low pressure side to the chamber housing or alternatively connected at its high pressure side to inlet 18.

Connected to the upper chamber 12 in a suitable manner, such as shown in Figs. 1 and 2, is an annular cleansing gas inlet portion 24 of the housing 10 which is in fluid communication with a duct 26 connected to a filtering unit 28 situated at the terminus of a duct 26. The purpose and operation of the annular inlet will be set forth in detail hereinafter.

Upper and lower chambers 12 and 16 contain a plurality of gas streamlining or collimating tubes 30 and 40 respectively, which assure streamline fluid flow through the monitor. The outer annular rows of these tubes in chamber 12 communicate only with the annular inlet 24 while the inner group of tubes allows flow of only the gas through contaminated gas inlet 18. Thus there can be no mixing or diffusion of the two fluids in chamber 12. At the ends of the tubes 30 chamber 14 begins which could cause diffusion of the fluids except for the streamline collimated flow created by the tubes 30 in chamber 12. These tubes may be of glass, metal or any other suitable material and are secured to the housing 10 in any suitable manner such as by the conventional boiler tube and plate method. As shown in Fig. 1, plates 32 secured to the housing 10 at each end of the tubes 30 maintain the tubes in their proper position. Similar construction in the lower chamber properly supports the tubes 40 therein contained.

Central chamber 14 houses a plurality of electrodes 34 the number of which is not critical but two are preferred for economy and simplicity and further, since in accordance with the invention there is no need for even a partial shutdown or a separate cleaning operation, two electrodes which are always in full operation are sufficient. These electrodes, spaced circumferentially within the chamber, are positioned in fluid communication with, and immediately below, the tubes communicating with the annular inlet 24. Electrically connected to the electrodes 34, along with a battery 38 of such voltage to insure efficient collection of the ions produced by the radioactive material in the gas, is a conventional radioactivity indicating circuit and device well known to one skilled in the art. For example, but not by way of limitation, the indicator 36 may be made to include a current amplifier tube which energizes a meter for indicating the activity of the gas passing through the housing 10 and may also energize an input coil of a recording device for suitably recording the activity. These latter electrical elements are not shown in detail since they do not form a part of the invention, but rather are of conventional design.

In operation, blower 20 induces contaminated radioactive air to enter through inlet 18 which is connected to the medium to be tested. Simultaneously, a cleansing gas such as air is drawn through filter 28 into annular inlet 24. These two fluids pass down through their respective tubes, the inner contaminated fluid flow pipes being surrounded by an envelope of clean gas in the outer tubes. Upon entering chamber 14, containing charged electrodes 34, the gases having been collimated by tubes 30 have been found to exhibit a minimum of diffusion at this point. Nuclear radiations, such as alpha, beta, or gamma radiations, from the material contained in the contaminated gas produce ions in the gas. These ions migrate to the charged electrodes causing a discharge and a corresponding current flow in a well-known manner. This is indicated as desired by means of the electronic circuit 36.

At this time the novel features of the invention are clearly in evidence. The annular flow of clean air is directed onto the electrodes 34 as well as the sides of the housing 10. This flow or sheath of clean air effectively prevents the migration of contaminating particles or gases to the electrodes and the housing sides, thus substantially preventing an undesirable background buildup. It has been these problems of electrode contamination and background buildup which have plagued the art and which the present invention is designed to overcome.

As an example of a specific embodiment, but by no means for purposes of limitation, it has been found that with a 6-in. diameter of the housing 10, a 2-in. axial inlet and a 2-in. annular inlet will permit 30 l./m. smoke or contaminated gas and 70 l./m. clean air through 12-in. long, 12 mm. diameter tubes in a streamline flow. In the cleansing gas inlet portion 24 of the housing 10 was placed a plate (not shown) having $\frac{1}{16}$-in. diameter holes spaced $\frac{1}{4}$-in. on centers which helped equalize the air flow through the 12 mm. diameter tubes.

In the event contamination at the ends of the tubes 30 in the upper chamber 12 should cause undue variations in the recordings in some instances, the chamber housing may be formed in a U shape with the electrodes at the base of the U. The air then would remain in streamline, collimated flow around the bends of the U to preclude undesirable fouling of the ends of the tubes.

From the foregoing detailed description, it will be evident that there are a number of changes, adaptations and modifications of the present invention that come within the province of those skilled in the art; however, it is intended that all such variations in structure, modes of usage and materials be considered to be within the scope of this invention as limited solely by the appended claims.

We claim:

1. An air radioactivity monitor comprising an elongated housing; an axial contaminated air inlet at a first end of the housing, an annular clean air inlet surrounding said contaminated air inlet, means for purifying air and supplying the purified air to said clean air inlet, a first bank of collimating tubes having axes parallel to the axis of said housing and filling the first end of said housing adjacent said inlets, said contaminated air inlet communicating only with a first group of tubes adjacent the axis of said housing and said clean air inlet communicating only with a second group of tubes, said second group of tubes surrounding said first group of tubes and being bounded by the wall of said housing, said first bank of tubes extending only a portion of the length of said housing, a pair of electrodes positioned diametrically opposite to each other in said housing, adjacent said first bank of tubes, the interior of said housing being unobstructed between said electrodes, a second bank of collimating tubes in said housing on the other side of said electrodes from said first set, said last named set of tubes having axes parallel to the axis of said housing and terminating adjacent the second end of said housing, air outlet means in said second end of said housing, means for producing a continuous flow of air through said housing from said inlets to said outlet and circuit means attached to said electrodes adapted to indicate the presence of radioactivity in said air.

2. An air radioactivity monitor as defined in claim 1 wherein said housing and said collimating tubes are rectilinear, whereby said first and second banks of tubes are in alignment with each other.

References Cited in the file of this patent

UNITED STATES PATENTS

| 2,625,657 | Kanne | Jan. 13, 1953 |
| 2,755,391 | Keyes | July 17, 1956 |